(12) United States Patent
Ho et al.

(10) Patent No.: US 6,889,360 B1
(45) Date of Patent: May 3, 2005

(54) REPRESENTING IMS TRANSACTION DEFINITIONS AS XML DOCUMENTS

(75) Inventors: Shyh-Mei Ho, Cupertino, CA (US); Holger Juschkewitz, Stuttgart (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/552,636

(22) Filed: Apr. 19, 2000

Related U.S. Application Data

(60) Provisional application No. 60/151,482, filed on Aug. 30, 1999.

(51) Int. Cl.[7] .......................... G06F 17/30; G06F 17/00; G06F 7/00
(52) U.S. Cl. ................ 715/513; 707/104.1; 707/103 R; 707/100; 707/10; 715/523; 715/522
(58) Field of Search ................................. 715/523, 522, 715/513; 707/10

(56) References Cited

U.S. PATENT DOCUMENTS

| | | | | |
|---|---|---|---|---|
| 5,333,266 A | * | 7/1994 | Boaz et al. | 709/206 |
| 5,715,453 A | * | 2/1998 | Stewart | 715/513 |
| 5,754,772 A | * | 5/1998 | Leaf | 709/203 |
| 5,781,739 A | | 7/1998 | Bach et al. | 395/200.57 |
| 5,903,891 A | * | 5/1999 | Chen et al. | 707/10 |
| 5,940,075 A | * | 8/1999 | Mutschler et al. | 345/760 |
| 6,012,067 A | * | 1/2000 | Sarkar | 707/103 R |
| 6,023,684 A | * | 2/2000 | Pearson | 705/35 |
| 6,038,393 A | * | 3/2000 | Iyengar et al. | 717/104 |
| 6,125,391 A | * | 9/2000 | Meltzer et al. | 709/223 |
| 6,209,124 B1 | * | 3/2001 | Vermeire et al. | 717/114 |
| 6,229,534 B1 | * | 5/2001 | Gerra et al. | 345/733 |
| 6,311,165 B1 | * | 10/2001 | Coutts et al. | 705/21 |
| 6,532,463 B1 | * | 3/2003 | Robbins et al. | 707/9 |
| 6,606,631 B1 | * | 8/2003 | Martin et al. | 707/101 |

FOREIGN PATENT DOCUMENTS

| | | |
|---|---|---|
| EP | 0817016 A2 | 7/1998 |
| WO | WO 98/02808 | 10/1997 |
| WO | WO 98/35284 | 11/1998 |

OTHER PUBLICATIONS

Iyengar, Sridhar; XML Metadata Interchange (OMG XMI) Distributed Metadata Interchange for the WEB Generation; Apr.–1999; Unisys.*

Web Interface Definition Language (WIDL), W3C Recommendation; Sep. 22, 1997; http://www.w3.org/TR/NOTE-widl.*

IBM; Converting HTML to Well Formed XML with Preference Based Tag Expansion; Jul. 1999; Kenneth Mason Publications Ltd.; Research Disclosure Database No. 423111.*

(Continued)

*Primary Examiner*—Joseph Feild
*Assistant Examiner*—Nathan Hillery
(74) *Attorney, Agent, or Firm*—Kunzler & Assoc.

(57) ABSTRACT

A method for communicating with an Information Management System (IMS) using eXtensible Markup Language (XML) documents includes the steps of receiving a document comprising an IMS transaction definition encoded in XML; obtaining a Document Type Definition (DTD) specifying rules for decoding the IMS transaction definition; parsing the XML document using the DTD to decode the IMS transaction definition; and providing the decoded IMS transaction definition to the IMS. A system and apparatus for implementing the method are also provided.

21 Claims, 11 Drawing Sheets

OTHER PUBLICATIONS

Brodsky, S.; "XMI Opens Application Interchange"; Mar. 30, 1999; IBM; pp. 1–12.*

"An Automated Technique for Mapping Presentation of Different Datastreams"; Research Disclosure, Apr. 1999; pp. 530–534.

J. Seaman; "Is IBM's IMS your Achilles' heel? (data communications, protocol convertor failure)"; Computer Decisions, vol. 16, No. 6, May 1984; pp.–88, 92, 94–95. (Abstract Only).

M. Pozefsky; Systems Network Architecture (SNA) Logical Unit 6.2 (LU 6.2) Advanced Program–to–Program Communications (APPC); SEAS (SHARE European Association) Proceedings of the Anniversary Meeting 1983 on Office Automation; pp. 213–224. (Abstract Only).

RP Bostrom; "Successful application of communication techniques to improve the systems development process"; Information and Management, vol. 16, No. 5, May 1989; pp. 279–295. (Abstract Only).

T. Harder et al.; "Transaction systems and TP Monitors. System problem definition and implementation"; Informatik Forschung und Entwicklung, vol. 1, No. 1; pp. 3–25. (Abstract Only).

S. Defazio; "Database extensions for complex forms of data"; Proceedings 15th International Conference on Data Engineering, 1999; p. 166. (Abstract Only).

* cited by examiner

REPRESENTING IMS TRANSACTION DEFINITIONS AS XML DOCUMENTS

RELATED APPLICATIONS

This application claims the benefit of U.S. Application No. 60/151,482, filed Aug. 30, 1999, for "IMS TRANSACTIONS IN XMI," which is incorporated herein by reference.

BACKGROUND OF THE INVENTION

Field of the Invention

The present invention relates generally to transaction processing systems. More particularly, the present invention relates to a system and method for representing IMS transaction definitions as XML documents.

Identification of Copyright

A portion of the disclosure of this patent document contains material subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Relevant Technology

With the explosive growth of the Internet, most of the world's computer systems are now interconnected or capable of being interconnected. However, in order to share data, the systems need to understand each other's data formats. In recent years, the computer industry has evolved at such a rapid pace that systems developed only a few years apart use vastly different and incompatible formats. Such incompatibility problems tend to increase with the "age" differences of the systems.

The Information Management System (IMS) is one of the oldest and perhaps the most popular transaction processing (TP) systems. A TP system supervises the sharing of resources for concurrently processing multiple transactions, such as queries to a database. Anyone who has ever used an ATM, rented a car, or booked a flight, has probably used IMS.

IMS was developed by IBM the 1960's as a inventory tracking system for the U.S. moon landing effort. Today, interfacing IMS with newer systems, particularly with systems of different manufactures over the Internet, is problematic.

As illustrated in FIG. 1, an IMS 10 typically includes two major components: an IMS Transaction Monitor (IMS/TM) 12, which is responsible for scheduling, authorization, presentation services and operational functions, and a hierarchical database 14, DL/I. Both components are independently configurable. For example the IMS/TM 12 can use a relational database, such as DB/2, rather than DL/I. The various components of an IMS 10 communicate via the MVS operating system 16.

As illustrated FIG. 2, the architecture of IMS is divided into four regions. For example, a Message Processing Region (MPR) 20 is used to execute message-driven applications 18. Execution of applications 18 in this region 20 is triggered by incoming messages, such as those received from a terminal.

By contrast, applications 18 in a Batch Message Processing (BMP) 22 region are not message driven. They are usually scheduled to run at times of low system activity, such as nights and weekends. Typically, such applications 18 perform a number of predefined operations, after which they immediately terminate.

An Interactive Fast Path (IFP) 24 region allows fast and simple requests to the database 14. Applications 18 operating in the IFP 24 bypass the normal scheduling mechanism, providing relatively fast response times. In general, IFP applications 18 stay resident even if they are not needed.

An IMS Control Region (IMSCTL) 26 is responsible for all TP tasks, as well as for controlling all dependent regions (MPR 20, BMP 22, and IFP 24). Essentially, the IMS Control Region 26 has three main responsibilities: telecommunications, message scheduling, and logging/restart.

For example, IMSCTL 26 controls the connected terminals 28 (illustrated in FIG. 3), receiving/sending messages from/to the terminals 28. Moreover, IMSCTL 26 logs all transactions in order to provide the capability of undoing non-committed transactions in the event of a system failure.

In addition, every time IMSCTL 26 receives a message from a terminal 28, it schedules an application 18 to process the message. IMSCTL 26 identifies the desired application 18 and puts the message in the application's message queue 30. The application 18 processes the requests in its message queue 30 and responds to the originating terminal 28 by placing the response in the terminal's message queue 32.

As illustrated in FIG. 4, an IMS 10 obtains all of its information about the structure and behavior of its components (applications, databases, transactions, etc.) from macro statements 34 (hereinafter "macros"). Certain macros 34 are referred to as "transaction definitions" 35 because they define how transactions are processed.

For example, as shown in FIG. 4, an application (APPLCTN) macro 36 defines the behavior of a particular IMS application 18. An APPLCTN macro 36 exists for each application 18 in the IMS 10, and defines, for example, the application's name, resource requirements, and appearance.

An APPLCTN macro 36 is followed by a zero or more (TRANSACT) macros 38, which define the various transactions applicable to the application 18. A TRANSACT macro 38 specifies the appearance of a transaction to be performed by an application 18, identifying whether the transaction is IMS exclusive, IMS Fast Path potential or IMS Fast Path exclusive. Furthermore, a TRANSACT macro 38 specifies the transaction code that causes the application 18 named in the APPLCTN macro 36 to be scheduled for execution in an IMS processing region.

Currently, IMS is only capable of processing transactions previously defined by the APPLCNT and TRANSACT macros 36, 38. A user may not initiate arbitrary transactions, such queries of the database 14, that have not been previously defined. Moreover, in order to change the above-described macros, one must initiate a process called "system generation," which necessitates shutting down the IMS 10 for a period of time.

In addition, the above-described IMS macros 36, 38 have a proprietary format, which is a detriment in interfacing with remotely located systems from different vendors. Currently, the dominant Internet format is the HyperText Markup Language (HTML), a variant of the eXtensible Markup Language (XML). Providing a technique for delivering IMS transactions definitions to an IMS 10 using interchangeable documents, such as XML documents, would be a first step in being able to initiate arbitrary IMS transactions over the Internet.

Accordingly, what is needed is a system and method for representing IMS transaction definitions in an interchangeable format, such as XML. What is also needed is a system and method for communicating with an IMS 10 using XML documents. In addition, what is needed is a system and method for creating a Document Type Definition (DTD) for use by a parser in converting between IMS transaction definitions and XML documents.

SUMMARY OF THE INVENTION

The present invention solves many or all of the foregoing problems by providing a system and method for communicating with an Information Management System (IMS) using extensible Markup Language (XML) documents.

In one aspect of the invention, a method includes the steps of receiving a document comprising an IMS transaction definition encoded in XML; obtaining a Document Type Definition (DTD) specifying rules for decoding the IMS transaction definition; parsing the XML document using the DTD to decode the IMS transaction definition; and providing the decoded IMS transaction definition to the IMS.

In another aspect of the invention, a method includes the steps of modeling an IMS transaction definition in a Universal Modeling Language (UML) to produce a UML object model; and processing the UML object model using an XML Metadata Interchange (XMI) utility to create the DTD.

In yet another aspect of the invention, a method includes the steps of obtaining an IMS transaction definition; obtaining a Document Type Definition (DTD) specifying rules for encoding the IMS transaction definition; and parsing the IMS transaction definition with the DTD to encode the IMS transaction definition in an XML document.

In still another aspect, a system includes a document reception module configured to receive a document comprising an IMS transaction definition encoded in XML; a parser configured to obtain a Document Type Definition (DTD) specifying rules for decoding the IMS transaction definition and further configured to parse the XML document using the DTD to decode the IMS transaction definition; and an IMS interface module configured to provide the decoded IMS transaction definition to the IMS.

In another aspect of the invention, a system includes a modeling tool configured to model an IMS transaction definition in a Universal Modeling Language (UML) to produce a UML object model; and an XML Metadata Interchange (XMI) utility configured to process the UML object model to generate the DTD and a number of access classes.

These and other objects, features, and advantages of the present invention will become more fully apparent from the following description and appended claims, or may be learned by the practice of the invention as set forth hereinafter.

BRIEF DESCRIPTION OF THE DRAWINGS

The present invention is more fully disclosed in the following specification, with reference to the accompanying drawings, in which.

DETAILED DESCRIPTION OF THE PREFERRED EMBODIMENTS

Certain presently preferred embodiments of the invention are now described with reference to the Figures, where like reference numbers indicate identical or functionally similar elements. The components of the present invention, as generally described and illustrated in the Figures, may be implemented in a variety of configurations. Thus, the following more detailed description of the embodiments of the system and method of the present invention, as represented in the Figures, is not intended to limit the scope of the invention, as claimed, but is merely representative of presently preferred embodiments of the invention.

Throughout the following description, various system components are referred to as "modules," "units," "utilities," "tools," or the like. In certain embodiments, these components may be implemented as software, hardware, firmware, or any combination thereof. For example, as used herein, a module may include any type of computer instruction or computer executable code located within a memory device and/or transmitted as electronic signals over a system bus or network. An identified module may include, for instance, one or more physical or logical blocks of computer instructions, which may be embodied within one or more objects, procedures, functions, or the like.

The identified modules need not be located physically together, but may include disparate instructions stored at different memory locations, which together implement the described logical functionality of the module. Indeed, a module may include a single instruction, or many instructions, and may even be distributed among several discrete code segments, within different programs, and across several memory devices.

Figure 1:
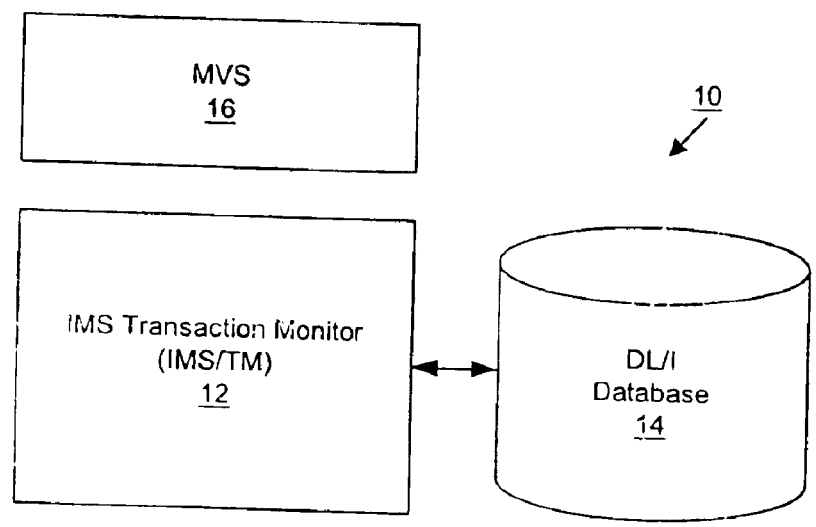
FIG. 1 is a schematic block diagram of an Information ManagementSystem (IMS)
Figure 2:
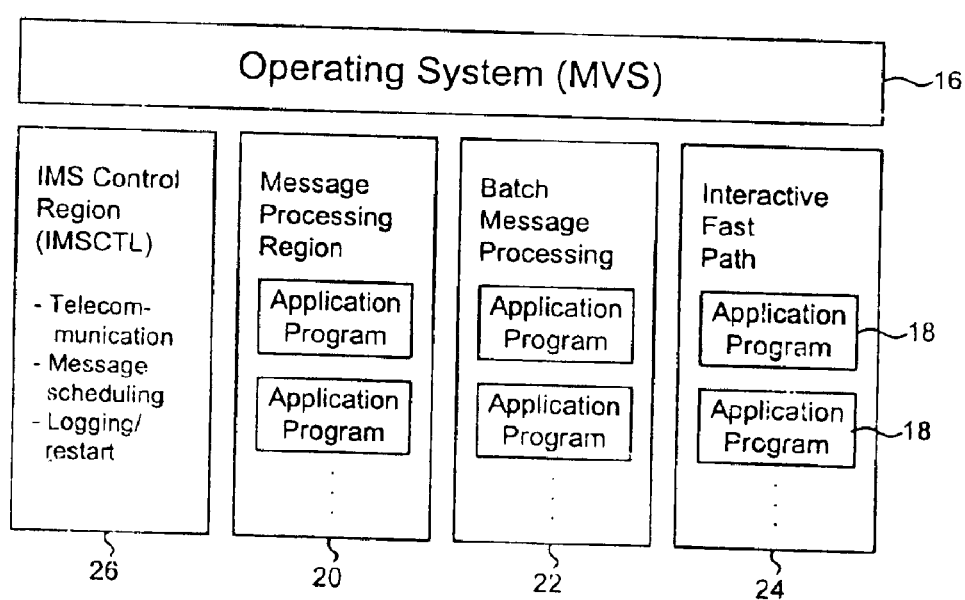
FIG. 2 is a schematic block diagram of IMS processing regions.
Figure 3:
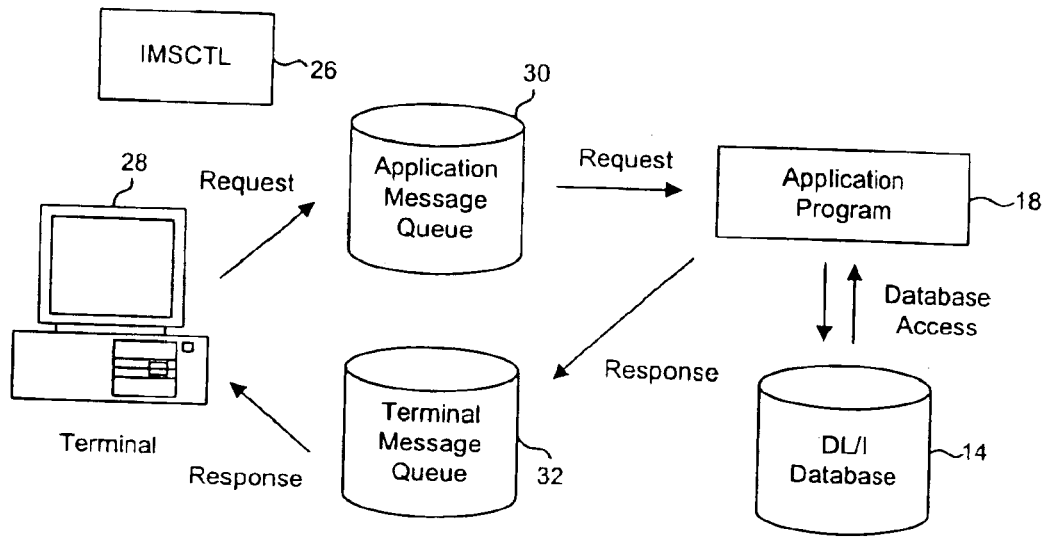
FIG. 3 is a schematic block diagram of message processing within an IMS.
Figure 4:
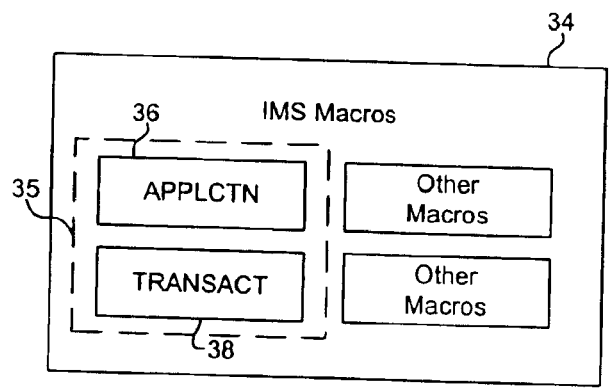
FIG. 4 is a schematic block diagram of IMS macros including two IMS transaction definitions.
Figure 5:
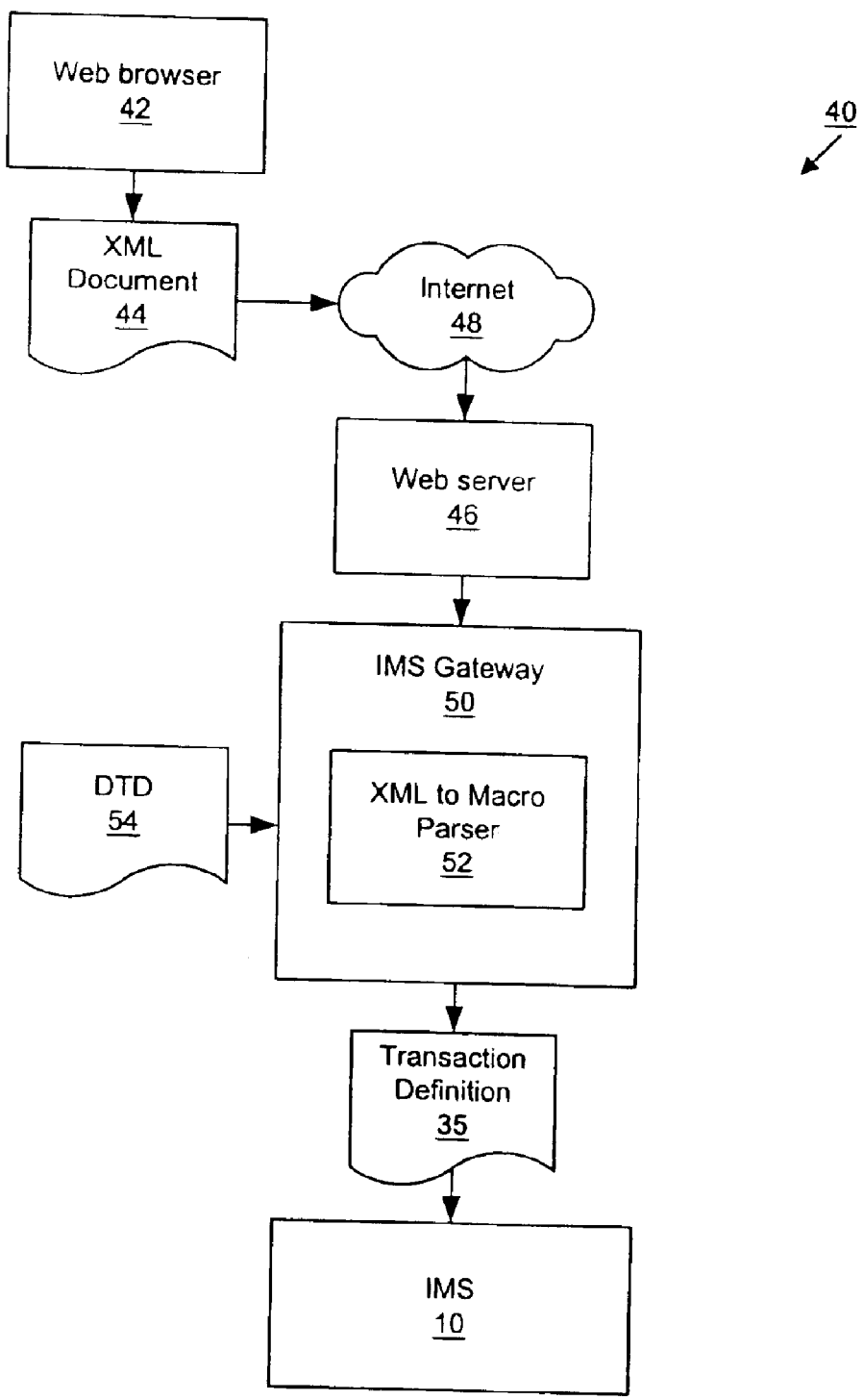
FIG. 5 is a schematic block diagram of a system for communicating with an IMS using extensible Markup Language (XML) documents according to an embodiment of the invention.

FIG. 5 illustrates a schematic block diagram of a system 40 for communicating with an Information Management System (IMS) 10 using interchangeable documents according a presently preferred embodiment of the invention. The system 40 may include a Web server 46, which may receive a specially-encoded document from a Web browser 42 via the Internet 48.

Various Web servers 46 may be used, such as the Windows NT Server™, available from Microsoft Corporation. Likewise, the Web browser 42 may be implemented using a conventional navigation tool for accessing the World Wide Web (WWW), such as Microsoft Internet Explorers or Netscape Navigator™.

The document 44 may be encoded to represent one or more IMS transaction definitions 35, such as APPLCTN or TRANSACT macros 36, 38, using an open document format, such as the extensible Markup Language (XML). Techniques for encoding IMS transaction definitions 35 in XML are described more fully hereafter. XML is similar to the HyperText Markup Language (HTML), but provides the ability to define custom tags by means of Document Type Definitions (DTDs).

In various embodiments, the system 40 also includes an IMS gateway 50, which may provide an interface between the Web server 46 and the IMS 10. The IMS gateway 50 may include an XML to Macro parser 52, which may parse the XML document 44 using a specialized DTD 54 to decode the IMS transaction definition 35. A system and method for generating the DTD 54 and the parser 52 is described more fully hereafter. After the transaction definition 35 is decoded, the IMS gateway 50 may provide the same to the IMS 10.

Figure 6:
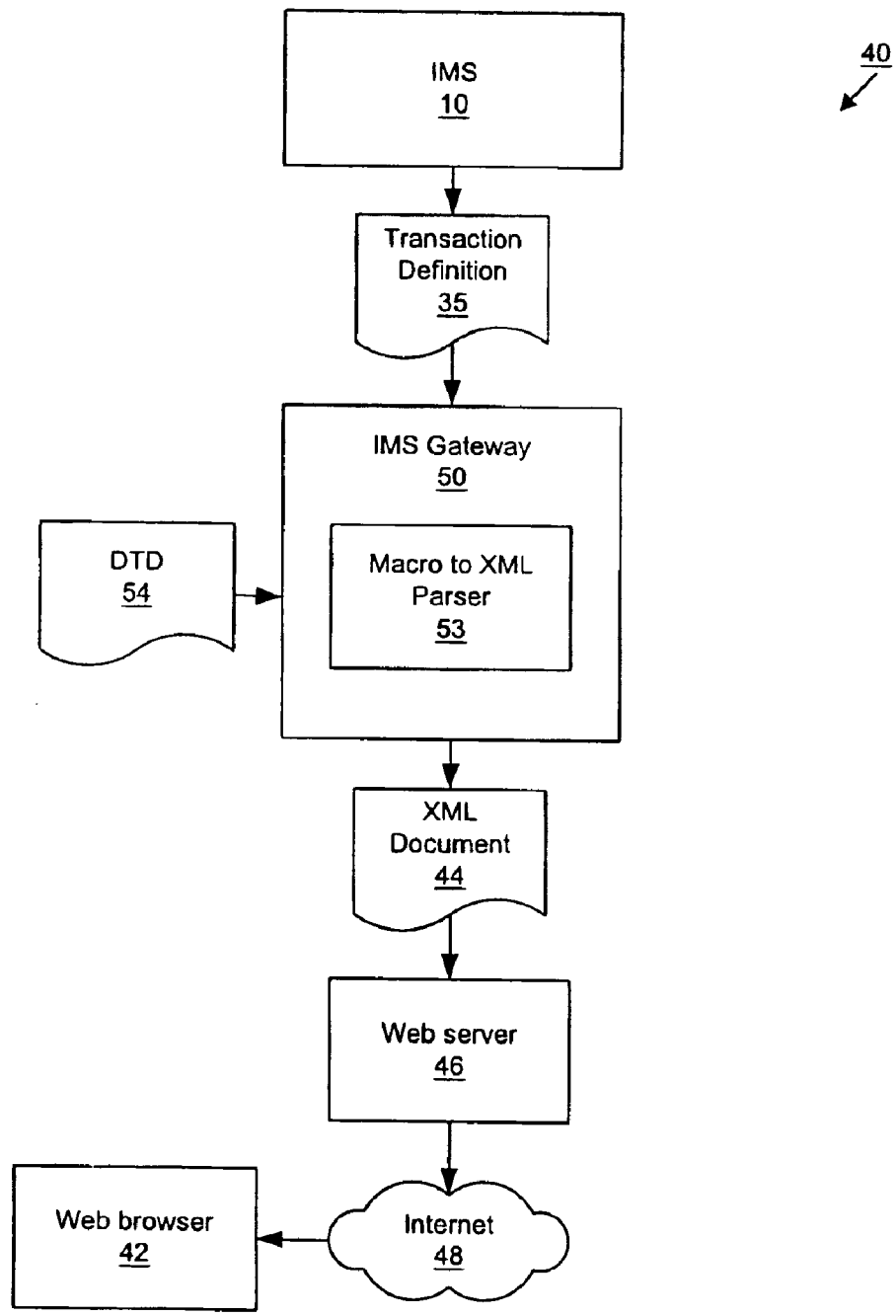
FIG. 6 is a schematic block diagram of a system for generating XML documents from IMS transaction definitions according to an embodiment of the invention.

In alternative embodiments, the system 40 may be used in reverse to generate an XML document 44 from an IMS transaction definition 35, as illustrated FIG. 6. For example, a transaction definition 35 may be obtained from the IMS 10 or another source. Thereafter, a Macro to XML parser 53 within the IMS gateway 50 may use the DTD 54 to encode the transaction definition 35 as an XML document 44. In certain embodiments, two different parsers 52, 53 are used, one for encoding and one for decoding a transaction definition 35, although the invention is not limited in this respect. After the XML document 44 is generated, the Web server 46 may transmit the same to a Web browser 42 or the like via the Internet 48.

Figure 7:
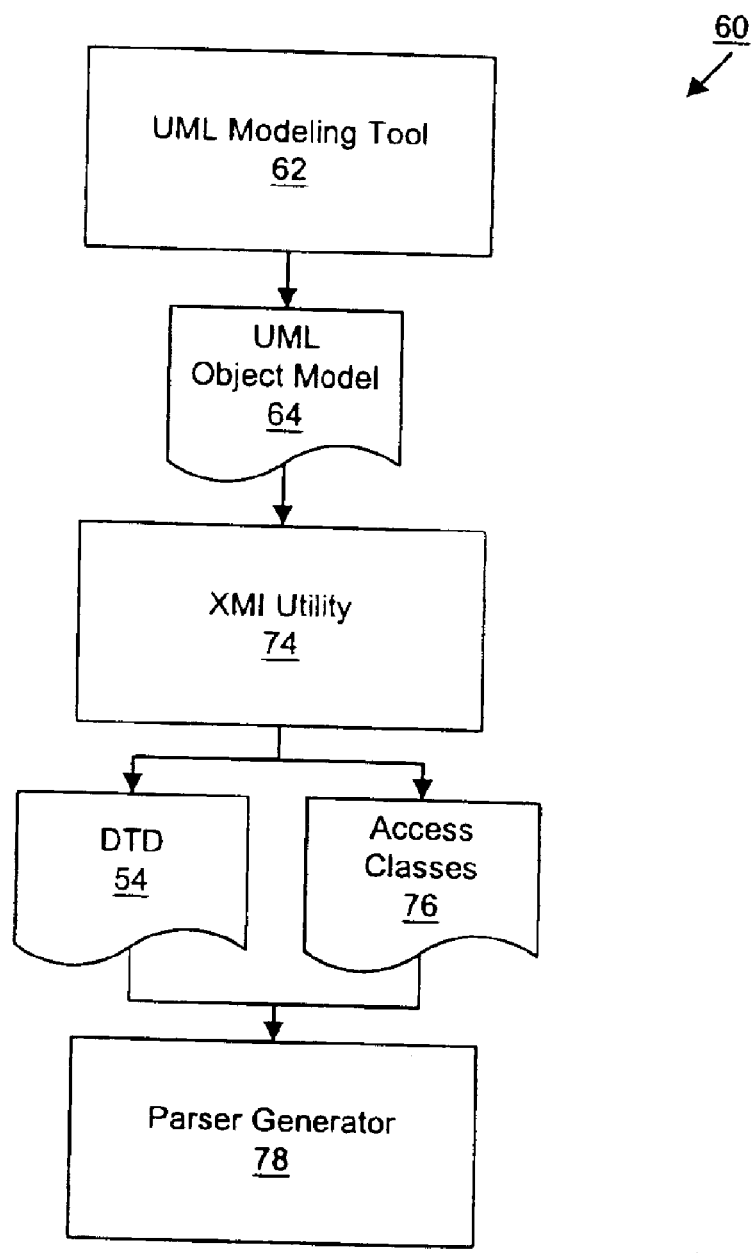
FIG. 7 is a schematic block diagram of a system for generating a parser, a number of access classes, and a Document Type Definition (DTD) for IMS transaction definitions according to an embodiment of the invention.

FIG. 7 illustrates a system 60 for generating the DTD 54 and a number of access classes 76 and for creating the parsers 52, 53 based on the DTD 54 and the access classes 76. In various embodiments, the system 60 includes a Uniform Modeling Language (UML) modeling tool 62. The UML modeling tool 62 may be used to produce a UML object model 64 to represent the transaction definitions 35. In one embodiment, the UML modeling tool 62 is Rational Rose™, a visual modeling tool available from Rational Software. Appendix A includes a UML Model Report generated by Rational Rose, as well as a description of various UML classes according to an embodiment of the invention.

UML is a language for specifying, visualizing, constructing, and documenting software systems, as well as business models and the like. UML is capable of representing the static, dynamic, environmental, and organizational aspects of almost any system.

Figure 8:
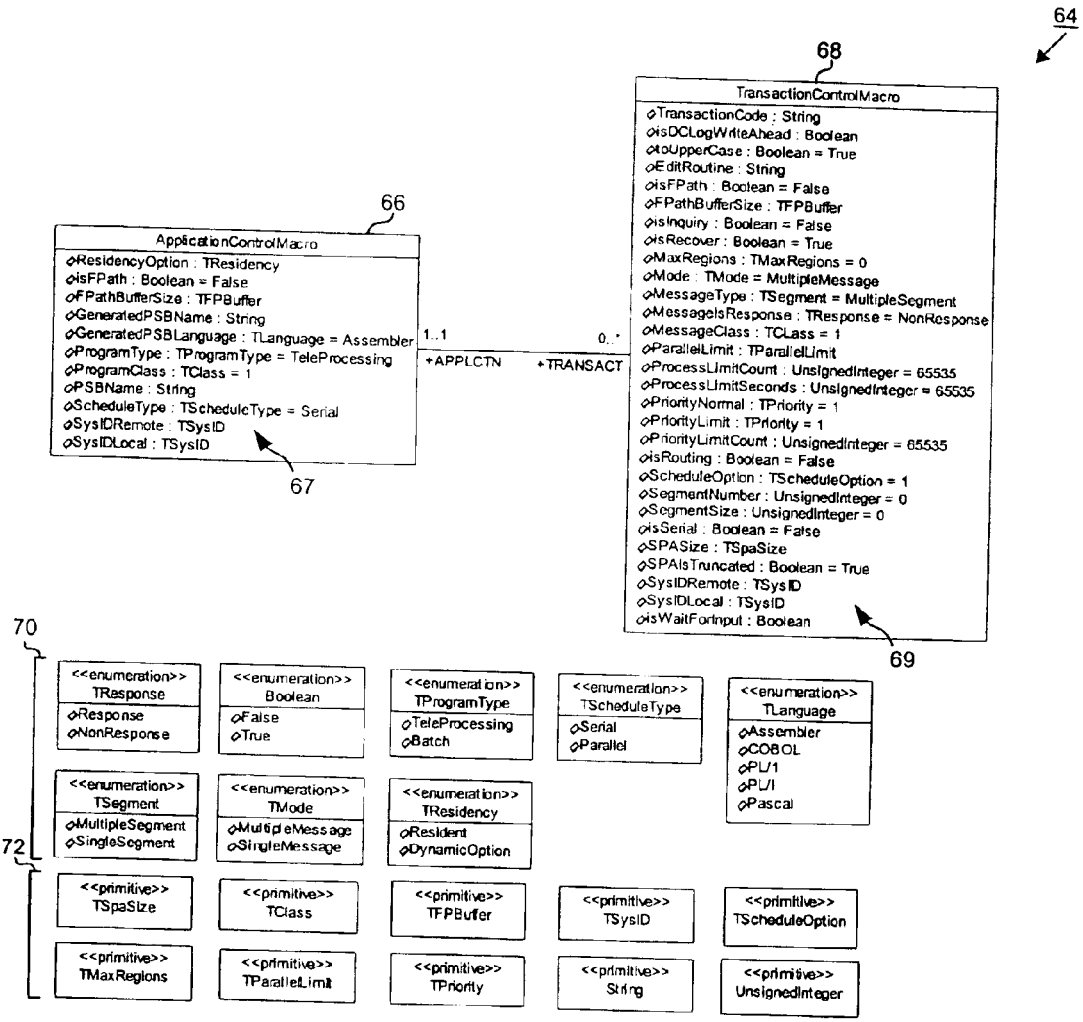
FIG. 8 is a schematic block diagram of a Universal Modeling Language (UML) object model representing IMS transaction definitions according to an embodiment of the invention.

FIG. 8 illustrates a UML object model 64 of the APPLCTN and TRANSACT macros 36, 38, as displayed by the UML modeling tool 62. In one embodiment, the model 64 includes an ApplicationControlMacro object 66 to represent the APPLCTN macro 36. Each parameter of the APPLCTN macro 36 may be represented by an attribute 67 of the ApplicationControlMacro object 66. For example, the PSBName attribute represents a parameter in the APPLCTN macro 36 for the Program Specification Block (PSB) name.

As illustrated, the ApplicationControlMacro object 66 may be linked to zero or more TransactionControlMacro objects 68. In one embodiment, a TransactionControlMacro object 68 represents the TRANSACT macro 38, each attribute 69 of the object 68 corresponding to a parameter of the macro 38. In addition, the UML object model 64 may include a number of enumeration stereotypes 70, which are type definitions of attributes 67, 69 having a fixed set of values. For example, an attribute 67 of the type, TscheduleType, may only have a value of "Serial" or "Parallel" in certain embodiments. Likewise, the UML object model 64 may include a number of primitive stereotypes 72, which represent the basic variable types of the model 64, such as strings, unsigned integers, and the like.

Referring again to FIG. 7, the system 60 may also include an XML Metadata Interchange (XMI) utility 74, such as XMI Toolkit™, available from IBM. XMI is an open standard released by the Object Management Group (OMG) for simplifying the exchange of data and metadata between different products from different vendors. IBM's XMI Toolkit is written entirely in Java and offers interfaces to facilitate incorporation into other projects or products.

In various embodiments, the XMI utility 74 automatically generates the DTD 54 from the UML object model 64. An example of a DTD 54 generated by the XMI utility 74 according to an embodiment of the invention is provided in Appendix B. In addition, the XMI utility 74 may create a plurality of Java XMI document access classes 76, which are used by the parsers 52,53 to parse and transform the document 44 based on the generated DTD 54. The access classes 76 provide an application programming interface (API) to allow the parsers 52, 53 to export a transaction definition 35 to an XML document 44 and to import an XML document 44 to a transaction definition 35.

The system 60 may also include a parser generator 78, such as the Java Compiler Compiler (JavaCC) 1.1, available from Sun Microsystems, although a variety of parser generators 78 may be used. JavaCC converts a grammar specification into a Java program that can recognize matches to the grammar. In certain embodiments, the parser generator 78 is only used in the creation of the parser 53 (Macro to XML), since the XMI access classes 76 generated by the XMI utility 74 may be used to directly import the entire content of the document 44 by invoking a single method. However, other techniques for parser generation may be used in alternative embodiments.

Figure 9:
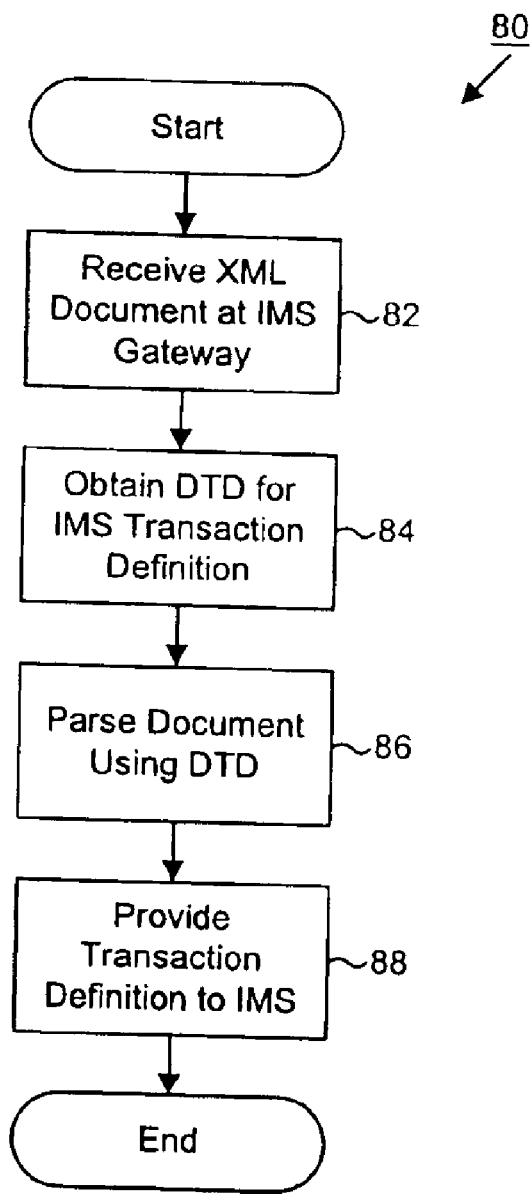
FIG. 9 is a schematic flowchart of a method for communicating with an IMS using XML documents according to an embodiment of the invention.

Referring now to FIG. 9, a schematic flowchart illustrates a method 80 for communicating with an IMS 10 using XML documents 44. The method may begin by receiving 82 a document 44 at an IMS gateway 50. The document 44 may be received, for example, from a Web server 46 attached to the Internet 48.

After the document 44 is received 82, the method 80 may continue by obtaining 84 a DTD 54 for IMS transaction definitions 35, such as the DTD 54 illustrated in Appendix B. Thereafter, the method may continue by parsing 86 the document 44 using the DTD 54 to decode the IMS transaction definition 35, and providing 88 the same to the IMS 10.

Figure 10:
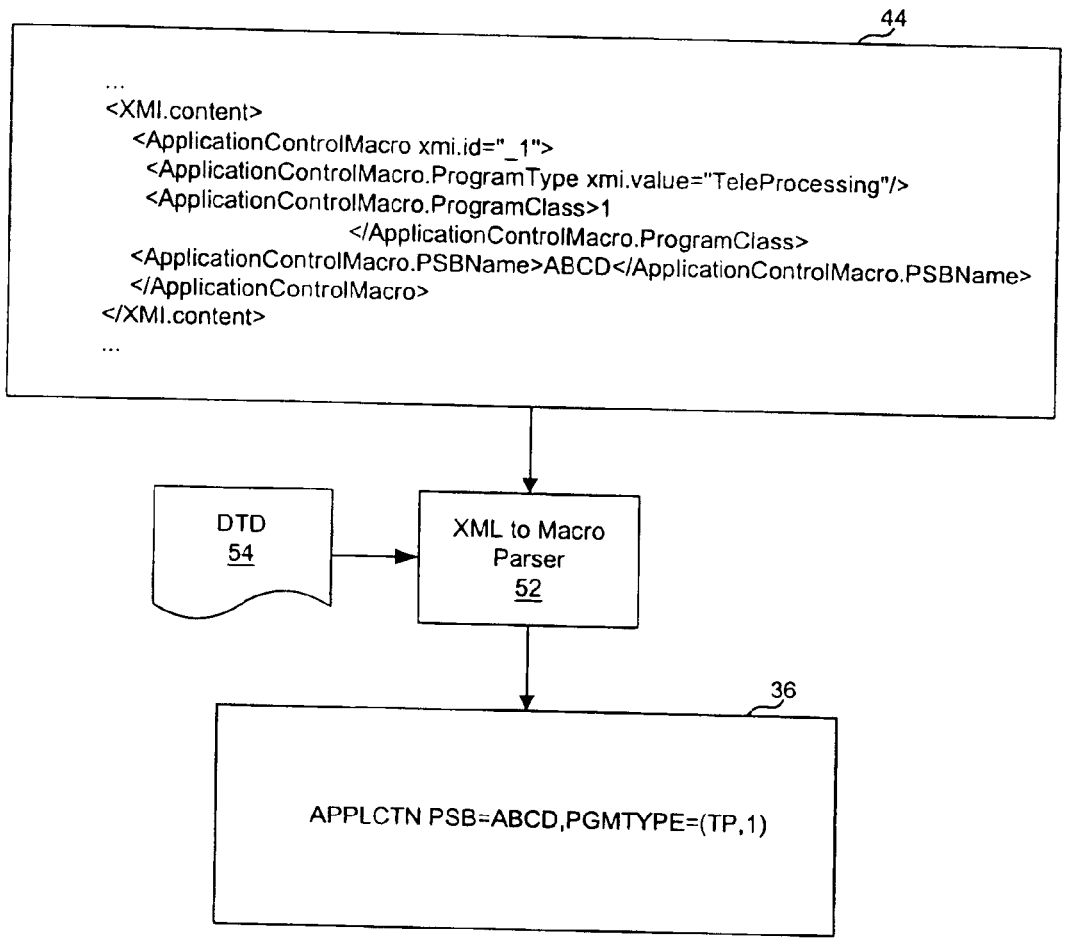
FIG. 10 is a schematic block diagram showing a conversion between an XML document and an IMS transaction definition according to an embodiment of the invention.
Figure 11:
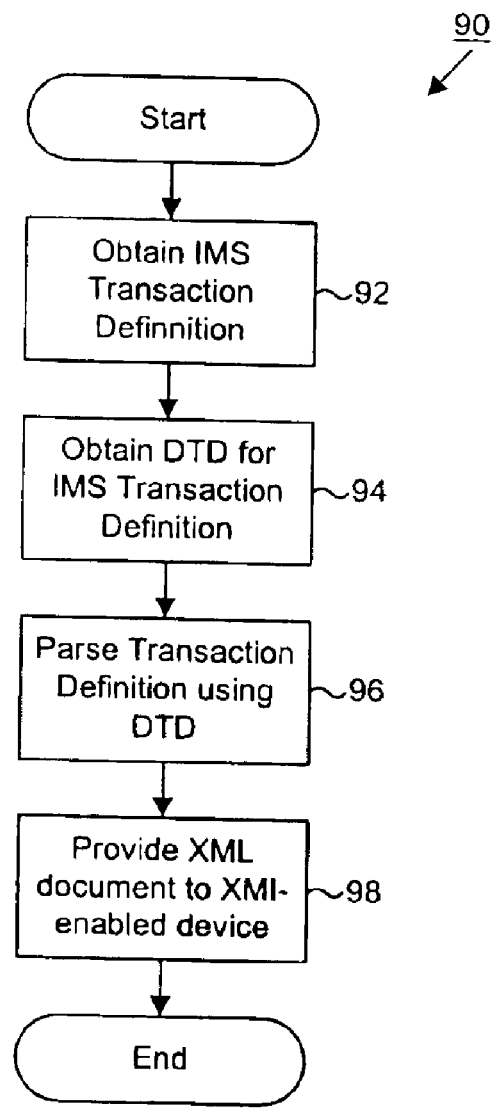
FIG. 11 is a schematic flowchart of a method for converting an IMS transaction definition into an XML document according to an embodiment of the invention.

FIG. 10 illustrates the above-described process. For example, a portion of an XML-encoded document 44 representing an APPLCTN macro 36 is shown. A parser 52 obtains the DTD 54 and parses the document 44 to decode the macro 36, i.e. "APPLCTN PSB=ABCD,PGMTYPE=(TP,1)." FIG. 11 illustrates a method 90 for generating an XML document 44 from an IMS transaction definition 35 according to an embodiment of the invention. The method 90 may begin by obtaining 92 an IMS transaction definition 35 from an IMS 10 or another source.

After the transaction definition 35 is obtained 92, the method 90 may continue by obtaining 94 a DTD 54 for IMS transaction definitions 35, as illustrated in Appendix B. Thereafter, the method 90 may continue by parsing 96 and transforming the IMS transaction definition 35 using the DTD 54 to encode the same as an XML document 44. Finally, the XML document 44 may be sent 98 to an XMI-enabled device, such as a Web browser 42 or the like.

Figure 12:
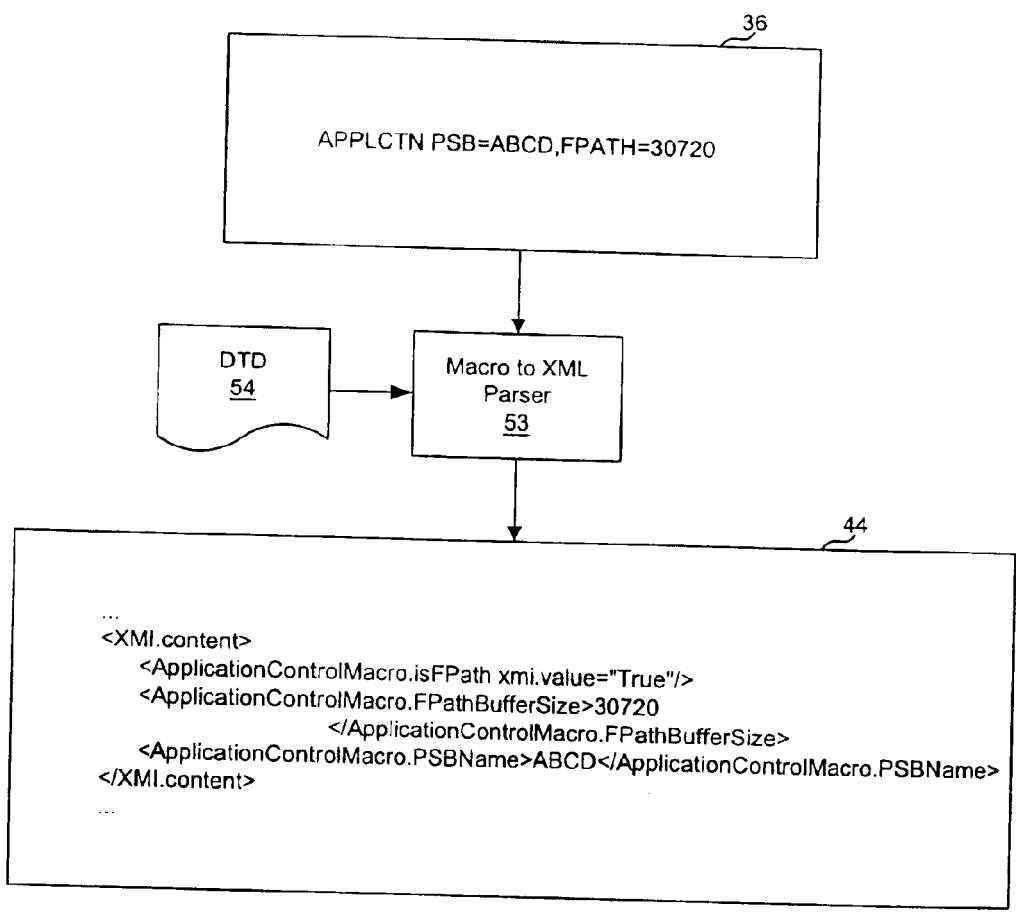
FIG. 12 is a schematic block diagram showing a conversion between an IMS transaction definition into an XML document according to an embodiment of the invention.

FIG. 12 illustrates the above-described process. A subset of an APPLCTN macro 36 is shown, i.e. "APPLCTN PSB=ABCD,FPATH=30720." The parser 53 obtains the DTD 54 and parses and transforms the macro 36 to encode the same as an XML document 44, as illustrated.

Figure 13:
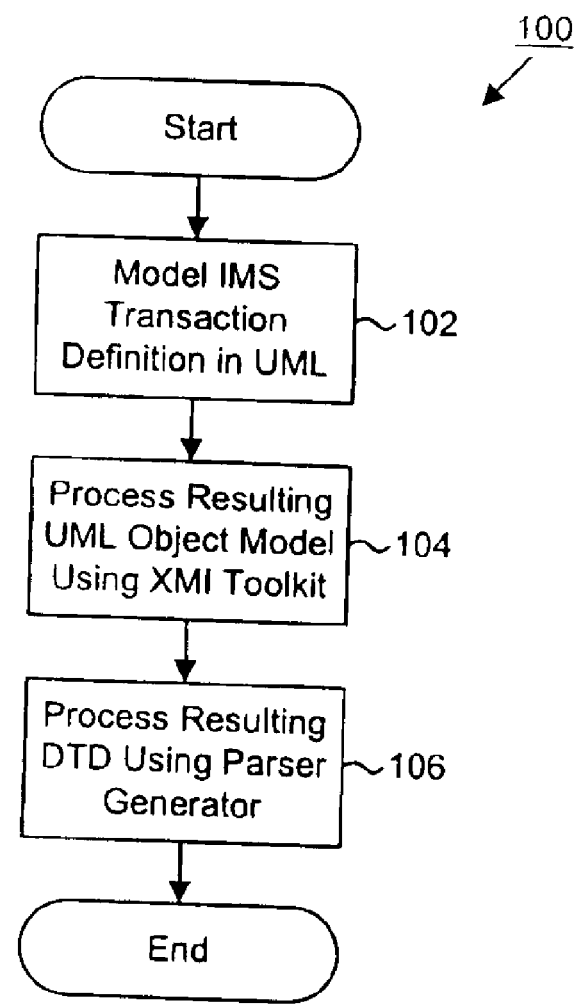
FIG. 13 is a schematic flowchart of a method for generating a parser, a number of access classes, and a DTD for IMS transaction definitions according to an embodiment of the invention.

FIG. 13 illustrates a method 100 for generating a DTD 54 and a parser 53 in accordance with an embodiment of the invention. The method 100 may begin by modeling 102 an IMS transaction definition 35 in a Universal Modeling Language (UML) to produce a UML object model 64. As previously noted, a visual modeling tool, such as Rational Rose, may be used for this purpose.

After the transaction definition 35 is modeled 102, the method 100 may continue by processing 104 the UML object model 64 using an XMI utility 74, such as IBM's XMI Toolkit, to generate the DTD 54 and various document access classes 76.

In certain presently preferred embodiments, the method 100 may continue by processing the DTD 54 using a parser generator 78, such as the Java Compiler Compiler (JavaCC), in order to generate the parser 53.

Based on the foregoing, the present invention offers a number of advantages over conventional IMS interface systems. For example, the present invention communicates with an IMS 10 using openly interchangeable documents, such as XML documents 44. The documents 44 may comply with the latest XMI standard, which enables an IMS 10 to exchange data with a variety of XMI-enabled devices, such as Web browsers 42 and the like. Accordingly, the present invention overcomes a first hurdle in the goal of facilitating arbitrary IMS transactions via the Internet.

Importantly, XML documents 44 may be easily converted for display on a variety of computing platform using the emerging XML Style Language (XSL) standard. As such, the XMI to IMS interface is capable of replacing all other interfaces between IMS and products from other vendors.

The present invention may be embodied in other specific forms without departing from its scope or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for communicating with a transaction processing system using eXtensible Markup Language (XML) documents, the method comprising:

receiving a document comprising a transaction definition encoded in XML, the transaction definition comprising macro statements that at least in part define a transaction;

obtaining a Document Type Definition (DTD) specifying rules for decoding the transaction definition;

parsing the XML document using the DTD to decode the transaction definition; and providing the decoded transaction definition to the transaction processing system.

2. The method of claim 1, wherein the transaction definition comprises an APPLCTN macro.

3. The method of claim 1, wherein the transaction definition comprises a TRANSACT macro.

4. The method of claim 1, wherein the DTD comprises an XML Metadata Interchange (XMI) DTD.

5. The method of claim 1, wherein the receiving step comprises receiving the document at transaction processing system gateway.

6. The method of claim 1, wherein the obtaining step comprises:

modeling a transaction definition in a Universal Modeling Language (UML) to produce a UML object model;

processing the UML object model using an XML Metadata Interchange (XMI) utility to create the DTD.

7. The method of claim 1, further comprising:

obtaining transaction definition;

obtaining a Document Type Definition (DTD) specifying rules for encoding the transaction definition; and parsing the transaction definition with the DTD to encode the transaction definition in an XML document.

8. A system for communicating with a transaction processing system using eXtensible Markup Language (XML) documents, the system comprising:

a document reception module configured to receive a document comprising a transaction definition encoded in XML, the transaction definition comprising macro statements that at least in part define a transaction;

a parser configured to obtain a Document Type Definition (DTD) specifying rules for decoding the transaction definition and further configured to parse the XML document using the DTD to decode the transaction definition; and a transaction processing interface module configured to provide the decoded transaction definition to the transaction processing system.

9. The system of claim 8, wherein the transaction definition comprises an APPLCTN macro.

10. The system of claim 8, wherein the transaction of definition comprises a TRANSACT macro.

11. The system of claim 8, wherein the DTD comprises an XML Metadata Interchange (XMI) DTD.

12. The system of claim 8, wherein the document reception module comprises a transaction processing system gateway.

13. The system of claim 8, further comprising:

a modeling tool configured to model a transaction definition in a Universal Modeling Language (UML) to produce a UML object model; and an XML Metadata Interchange (XMI) utility configured to process the UML object model to create the DTD.

14. The system of claim 8, wherein the parser is further configured to obtain a DTD specifying rules for encoding a transaction definition as an XML document and to parse the transaction definition using the DTD.

15. An article of manufacture comprising a program storage medium readable by a processor and embodying one or more instructions executable by the processor to perform a method for communicating with a transaction processing system using eXtensible Markup Language (XML) documents, the method comprising;

receiving a document comprising transaction definition encoded in XML, the transaction definition comprising macro statements that at least in part define a transaction obtaining a Document Type Definition (DTD) specifying rules for decoding the transaction definition;

parsing the XML document using the DTD to decode the transaction definition; and providing the decoded transaction definition to the transaction processing system.

16. The article of manufacture of claim 15, wherein the transaction definition comprises an APPLCTN macro.

17. The article of manufacture of claim 15, wherein the transaction definition comprises a TRANSACT macro.

18. The article of manufacture of claim 15, whrein the DTD comprises an XML Metadata Interchange (XMI) DTD.

19. The article of manufacture of claim 15, wherein the receiving step comprises receiving the document at a transaction processing system gateway.

20. The article of manufacture of claim 15, wherein the obtaining step comprises:

modeling the transaction definition in a Universal Modeling Language (UML) to produce a UML object model;

modeling the transaction definition in a Universal Modeling Language (UML) to produce a UML object model;

processing the UML object model using an XML Metadata Interchange (XMI) utility to create the DTD.

21. The article of manufacture of claim 15, the method further comprising:

obtaining the transaction definition;

obtaining a Document Type Definition (DTD) specifying rules for encoding the transaction definition, and parsing the transaction definition with the DTD to encode the IMS transaction definition in an XML document.

* * * * *